May 14, 1940.  C. EVANS  2,200,739
RAILROAD CROSSING AND DANGER SIGNAL
Filed Feb. 15, 1936  4 Sheets-Sheet 3
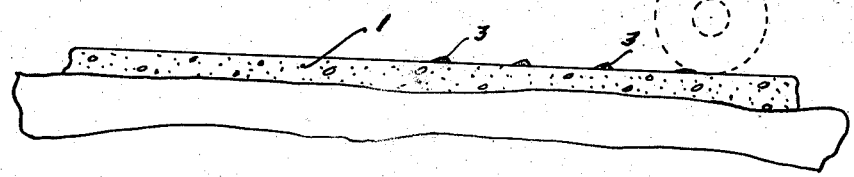
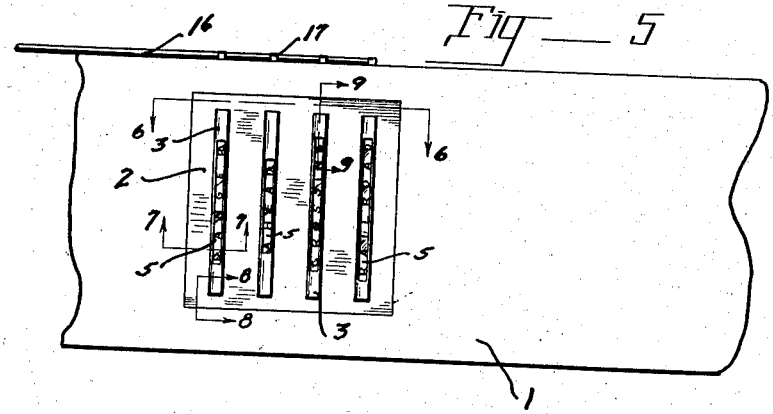
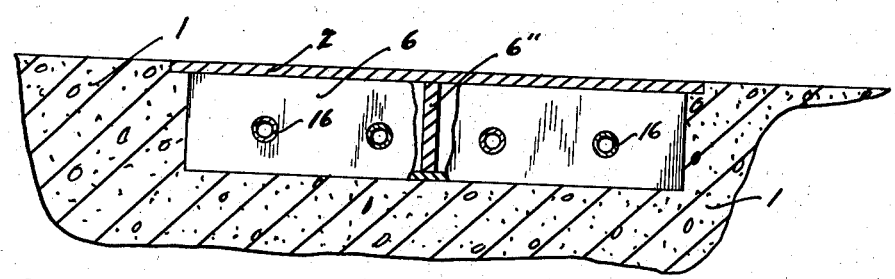
Inventor
Clyde Evans
By Clive Hartson
Attorney

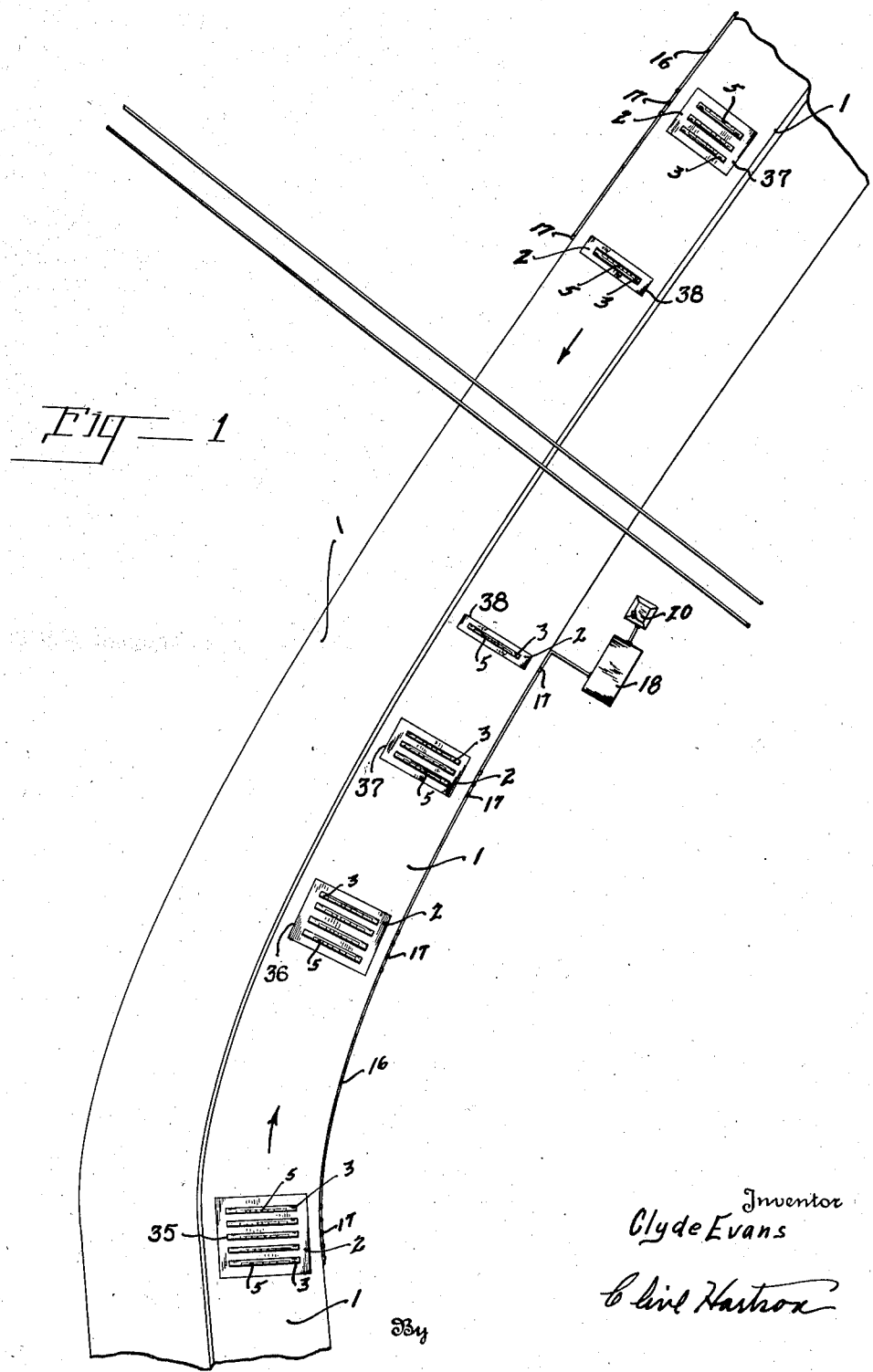

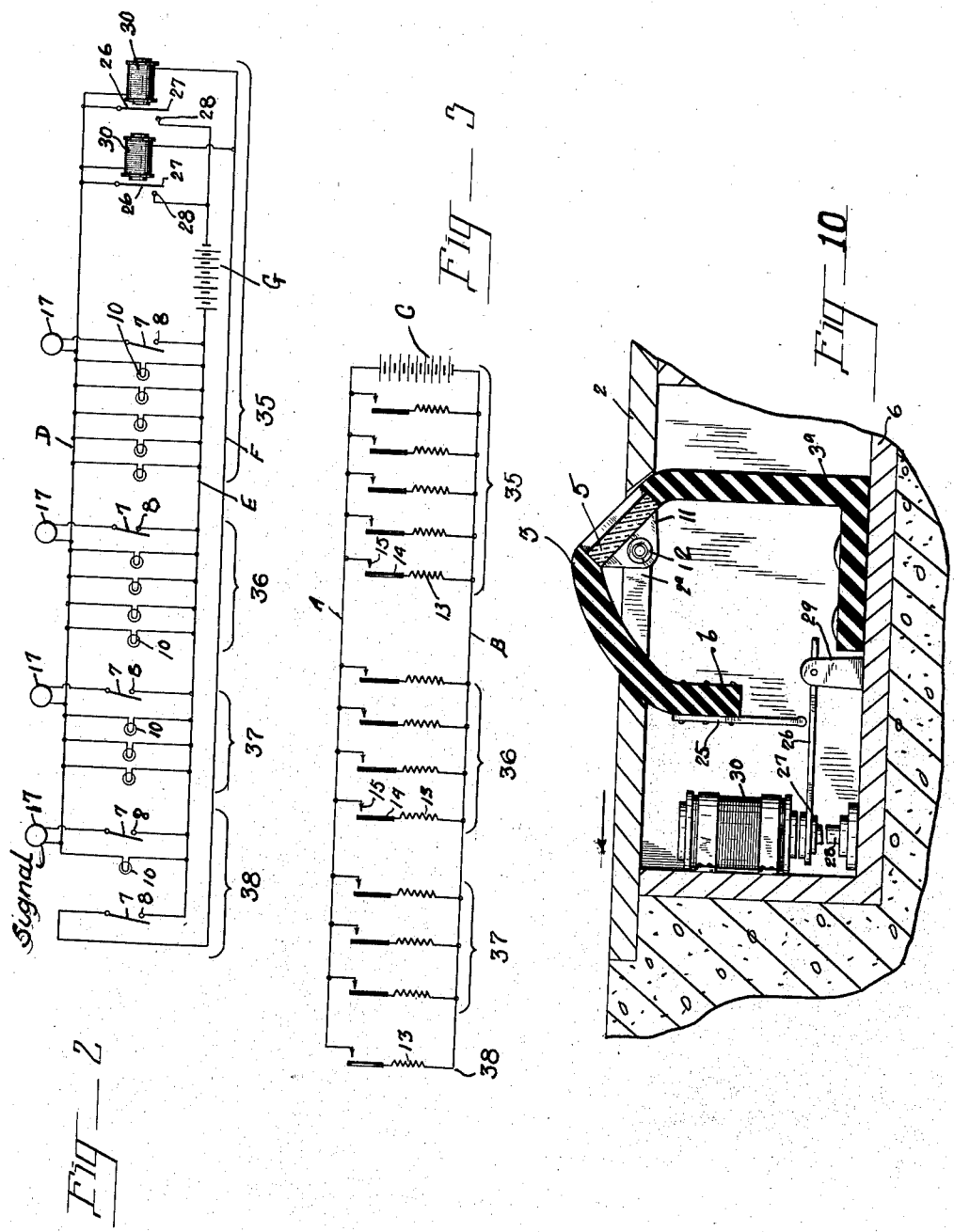

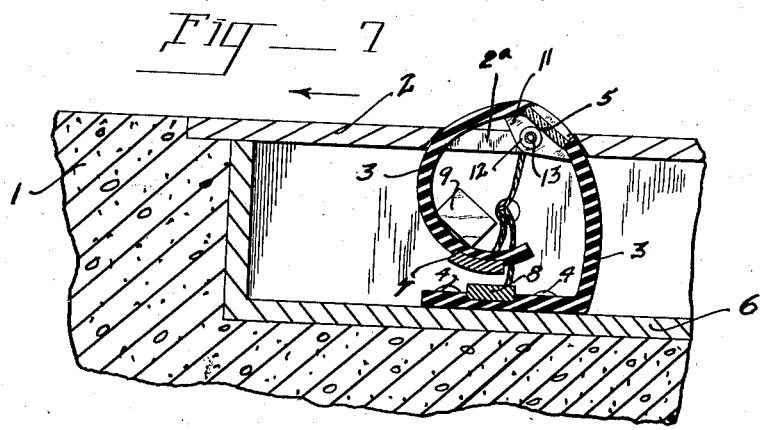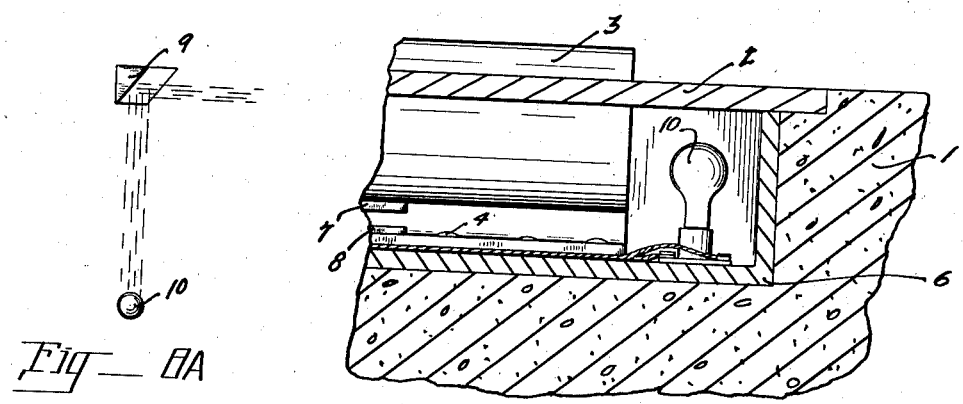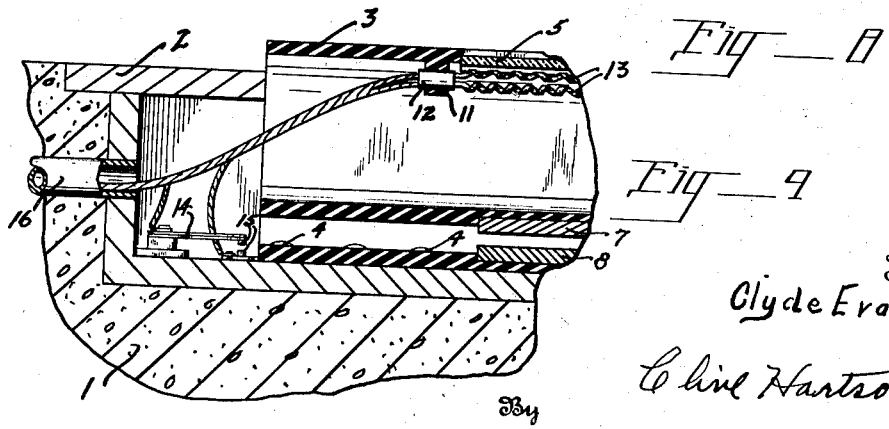

Patented May 14, 1940

2,200,739

UNITED STATES PATENT OFFICE 2,200,739

RAILROAD CROSSING AND DANGER SIGNAL

Clyde Evans, Portland, Oreg.

Application February 15, 1936, Serial No. 64,110

3 Claims. (Cl. 177—339)

My invention relates to highway warnings for warning drivers and passengers of vehicles of their approach to regions of actual or potential danger. My invention is especially directed toward adequately providing warning of the approach to a highway and railway grade crossing.

I achieve these results by providing easily surmountable obstructions in the line of approach to a grade crossing. They extend transversely to the approach to such crossing and are traveled over by the approaching vehicles. They yield to the vehicles and transmit a very slight shock to the riders, and are insufficient to endanger the vehicle even though traveling at a high speed. These obstructions, which I call blisters, are provided with switch contacts for closing electrical circuits as they yield to the weight of a vehicle. In addition to the switches, they are provided with illuminated openings within which warning legends may be displayed. The switches upon all or preselected blisters may be employed for closing electric circuits, which circuits can be employed for operating various types of warning devices, such as sound instruments, flashers, semaphores, bells, etc., or a combination of the same, and also to close electric lighting circuits for illuminating the openings in the blisters, and also to open certain circuits after a vehicle has passed thereover.

These blisters, I prefer to arrange in groups of varying numbers, as for instance, a group of five blisters, followed by a group of four, succeeded by a group of three, then finally one blister. This arrangement, or some other acceptable arrangement would in effect be a code signal of warning of approach to a grade crossing or other region of danger. Passing over groups so arranged would immediately warn travelers in vehicles that they approach a grade crossing. This coupled with visual and auditory signalling devices provides adequate warning of the approach to dangerous regions.

These and other objects of the invention will become apparent upon reading the description thereof aided by the views thereof in the accompanying drawings, wherein Figure 1 is a diagrammatical view of an intersecting railway track and highway and illustrates how my invention is employed as a warning device in conjunction therewith. Figure 2 is a diagram of an electric circuit employed in conjunction with circuit closing means operated by passing vehicles. These circuits are shown operating various signals. Figure 3 is a diagram of an electric circuit for heating the various circuit closing and warning devices to free them of snow and ice. Figure 4 is a side elevation of a highway and illustrates how the blisters are arranged to be engaged by wheels of passing vehicles. Figure 5 is a plan view of the same highway. This view illustrates how the blisters are arranged in groups, and their position in the roadway. Figure 6 is a sectional view of a highway looking transversely as shown by section line 6—6 in Figure 5. This view illustrates how the frame supporting the blisters is embedded in the roadway. Figure 7 is the sectional view indicated by section line 7—7 in Figure 5. This view illustrates the structure of the blisters and the circuit closing means. Figure 8 is the sectional view shown by the section lines 8—8 in Figure 5. This view illustrates the means for illuminating the plates in the blisters. Figure 8A is a diagram illustrating how light is reflected to the plates in the blisters. Figure 9 is the sectional view indicated by section line 9—9 in Figure 5. Figure 10 is similar to Figure 7 with the exception of a modification in the structure of the electric switch.

In the drawings similar characters refer to similar parts throughout the several views.

Referring to the drawings, 1 indicates a highway or roadway passing over a railroad track. Embedded in the travel lanes of the highway as it approaches the railroad are a number of frames 2 which are provided with a number of elongated slots 2a arranged transversely to such lane. These slots are sufficiently long to compel a vehicle traveling the lane to pass thereover, and are designated respectively by the numerals 35, 36, 37 and 38. In the views, the frames are shown having five, four, three and one slots. The number of slots provided is optional, but in the present instance I prefer to employ the arrangement shown. In positioning the frames, the frame having five slots is positioned farthest from the crossing, then nearer to the crossing is positioned the frame containing four slots, then still nearer the frame containing three slots, and finally the frame having one slot. The spacing between the frames is optional, though I prefer to provide a space between each group approximating one hundred feet. Protruding from each slot is a blister 3 having a rounded contour where it projects above the upper surface of the highway and the frame. This blister is preferably made of a heavy yieldable substance, such as rubber, and in cross section has a somewhat U shape with one leg rigidly secured to the bottom 6 of the frame by means of the fastening members 4. When it is stated that the blisters are formed of yieldable substance, it is meant that they are flexible and bend under the weight of a vehicle. However they have sufficient body and strength to prevent entire collapse when such vehicle passes thereover In the upper portion of the blister there is seated in an opening through the blister a transparent or translucent body or plate 5 which may have delineated thereon suitable warning legends as shown in Figure 5.

The free leg of the blister is provided with an electric contact 7 which engages the stationary contact 8 embedded in the other leg. These members constitute an electric switch 7—8 for closing an electric circuit, and have conductors connected with them for that purpose as shown in Figure 7. When a vehicle passes over these blisters there will be a very slight jar which will warn the passengers that they are passing over a danger signalling device, though such jar will be insufficient to endanger the vehicle though it travel at a high speed. This jar is occasioned by the fact that the blister top is elevated somewhat above the surface of the highway and the vehicle wheels when they engage it are momentarily raised at the same time the weight of the vehicle bends it down. This rapid up and down movement imparts a slight jar to the vehicle. As the vehicle wheels travel over the blister it yields sufficiently to close the switch 7—8, closing the circuit to which such switch is connected.

Figure 10 shows a modified blister and switch construction. This has a leg 3a, secured to base 6, and the other leg 3b, somewhat shorter, has an extension rod 25 attached thereto. This extension contacts and presses down the switch blade 26 thereby forming a contact between contacts 27 and 28. Both blade 26 and contact 28 may be connected for closing an electric circuit. The contacts are normally out of engagement. Blade 26 is supported by bracket 29. In conjunction with the switch blade there is employed an electric magnet 30 positioned so when energized it will raise the blade 26 and disengage the contacts 27 and 28. Figure 2 shows a circuit for which the switch will be described later.

In order to illuminate the plates 5, a lamp 10 is provided at one end of the blister and within the frame where it may readily be inserted or removed. Upon the free leg of the blister, or at some other suitable position within the frame, there is placed a reflecting device 9, arranged at an angle to reflect light rays from lamp 10 to and through plate 5.

In order to maintain the slots and blisters free from ice and snow, a resistance heater 13 is provided within the interior of the frame and between the legs of the blister. This is in a circuit shown in Diagram 3. In conjunction with the resistance heaters there are employed switches 14 of a metal which bends during temperature changes and causes the engagement of the contacts 15 which close a circuit to the heaters. The heater circuit is carried through an insulated sleeve 12 seated in the projection 11 of the blister. A conduit 16 provides means for introducing electric circuits from the exterior to the interior of the frames. Figure 3 shows the circuit for the heaters 13 wherein they are connected to the circuit A—B, which is energized by a source of electrical energy C.

The diagram in Figure 2 is in conformity to the arrangement of the blisters as shown in Figure 1. The blade 26 at the limit of its upward movement engages magnet 30, and at the limit of its downward movement, its contact 27 engages contact 28. It remains in either position, unless moved by magnet 30 or rod 25, by reason of the fact that the pivotal connection with the bracket 29 is somewhat stiff or binding. In the diagram in Figure 2, the lamps associated with blisters are arranged in groups of five, four, three and one, and each denotes an equal number of blisters, the same as shown in Figure 1. In this circuit not all of the switches 7—8 are connected in circuits, some are, and the remainder are idle. In the group of five, frame 35, the first two blisters employ the switch arrangement shown in Figure 10. These switches are connected in the circuit D—E which is energized by a source of electrical energy G. Closure of these switches illuminates the lamps 10 in each group of blisters, and they remain illuminated until the magnets 30 are energized and the switches 27—28 are opened. The magnets are energized by the closing of the switch 7—8 in the circuit E—F. The numeral 17 indicates an audible signalling device, such as a horn or bell, which may be mounted in proximity to each group of blisters. The numeral 18 indicates a box associated with signal 20 for electrical apparatus for operation of the signal, batteries, and other necessary apparatus. Any audible signal which is operated by electric impulse, and which is suitable for the purpose intended, may be employed. A switch, or a switch of each group may be connected to operate a solitary signal, either audible or visible, or both, which signal may be situated close to the railroad crossing as indicated by the numeral 20 in Figure 1.

As a vehicle approaches a highway grade crossing, traveling in the direction indicated by arrows in Figures 1, 7, and 8, it first comes into contact with the group of five blisters, then the group of four, after that the group of three and finally the solitary blister. The first two blisters engaged in the first group, or frame 35, close two switches 27—28 causing all lamps 10 to illuminate the plates 5 of all blisters. The next blister encountered, closes a switch 7—8 causing an audible signal 17 to operate momentarily, or the signal 20, or both signals. One or more switches 7—8 in each group is arranged to operate such signals. The switch 7—8 in the solitary blister is arranged to operate a signal and to energize circuit E—F thus opening switches 27—28. For this purpose two switches 7—8 may be employed in the solitary blister. The reason for having two switches 27—28 is to obviate the opening of circuit D—E should a preceding vehicle close final switch 7—8 as a following vehicle engages the first switch 27—28. The visual signals, in frames 35, 36, 37, and 38 are illuminated simultaneously, being done by the wheels closing switches in frame 35. Inasmuch as such vehicle is directly over or upon frame 35, the visual signals may not be seen by the occupants of the vehicle, but they can be seen by occupants of vehicles immediately following. However the audible signals will be heard, and the jars or jolts occasioned by passing over the blisters will be felt.

While a specific form of the improvement has been described and illustrated herein, it is desired to be understood that the same may be varied, within the scope of the appended claims, without departing from the spirit of the invention.

Having described my invention, I claim:

1. A railroad crossing and danger signal, comprising a frame embedded in the roadway and having a slot extending transversely thereof, a flexible member occupying such slot, said member having an inverted U-shaped cross section with one leg thereof fastened to the bottom of the frame and the other leg free to move, said member having a portion of its mid section extending through the slot and projecting above the surface of the roadway and depressible when engaged by wheels of a passing vehicle, an electric switch closed by movement of the free leg when said member is depressed, said switch comprising a stationary contact and a movable contact moved by the free leg to engagement with the first contact when said member is depressed.

2. A railroad crossing and danger signal for roadways, comprising a plurality of frames spaced at predetermined distances from a danger region and each embedded in the roadway with its upper surface level therewith, each frame being provided with one or more longitudinal slots extending transversely of such roadway, a flexible member in each slot and each being mounted in a frame and projecting through a slot and extending above the surface of the roadway, said member being depressed by the wheels of passing vehicles, an electric switch closed by the member when depressed, a transparent plate in the projecting portion of such member bearing a warning legend, an electric lamp mounted in the frame proximate one end of the flexible member, means for reflecting light rays from the lamp toward the reverse side of the plate, a circuit for said lamps closed by certain of said switches, and electrically operated switch opening means for opening the lamp circuit switches including a circuit for energizing said switch opening means controlled by other of the switches.

3. A railroad crossing and danger signal, comprising a plurality of frames spaced predetermined distances from a danger region and each embedded in the roadway with its upper surface level therewith, each frame being provided with one or more depressible members a portion of each of which project above the surface of the roadway, an electric switch incorporated in each member and closed by depression of such member, a transparent plate in the projecting portion bearing a warning legend, an electric lamp located proximate each member, means for directing light rays from the lamp to the reverse side of the plate, a circuit for said lamps closed by certain of said switches, and electric switch opening means for opening the lamp circuit switches including a circuit for energizing said switch opening means controlled by other of the switches.

CLYDE EVANS.